United States Patent
Stephan et al.

(10) Patent No.: US 11,657,622 B2
(45) Date of Patent: *May 23, 2023

(54) METHOD AND DEVICE FOR SUPPORTING AN ADVANCED DRIVER ASSISTANCE SYSTEM IN A MOTOR VEHICLE

(71) Applicant: Volkswagen Aktiengesellschaft, Wolfsburg (DE)

(72) Inventors: Max Stephan, Gifhorn (DE); Kristian Weiss, Berlin (DE); Sascha Bauer, Berlin (DE); Mehmet Eylem Kirlangic, Wolfsburg (DE); Andreas Wege, Berlin (DE); Robert Konnopka, Berlin (DE); Lars Krüger, Schorfheide (DE); Jesko Klandt, Berlin (DE); Christian Tendyck, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 145 days.

This patent is subject to a terminal disclaimer.

(21) Appl. No.: 17/400,968

(22) Filed: Aug. 12, 2021

(65) Prior Publication Data

US 2021/0374441 A1 Dec. 2, 2021

Related U.S. Application Data

(63) Continuation of application No. 16/325,971, filed as application No. PCT/EP2017/064407 on Jun. 13, 2017, now Pat. No. 11,120,278.

(30) Foreign Application Priority Data

Aug. 16, 2016 (DE) ..................... 10 2016 215 249.1

(51) Int. Cl.
*G06K 9/00* (2022.01)
*B60W 40/02* (2006.01)
(Continued)

(52) U.S. Cl.
CPC .............. *G06V 20/58* (2022.01); *B60W 40/02* (2013.01); *B60W 50/0098* (2013.01); *G06F 17/18* (2013.01); *G06V 10/00* (2022.01)

(58) Field of Classification Search
CPC .............. G06K 9/00805; B60W 40/02; B60W 50/0098; G06F 17/18; G06F 18/24; G06V 10/00
See application file for complete search history.

(56) References Cited

U.S. PATENT DOCUMENTS

| 6,775,395 B2 | 8/2004 | Nishigaki et al. ............ 382/104 |
| 9,286,525 B2 | 3/2016 | Nentwig |

(Continued)

FOREIGN PATENT DOCUMENTS

| CN | 103930794 A | 7/2014 | ............. G01S 15/10 |
| CN | 104678832 A | 6/2015 | ........... G05B 19/042 |

(Continued)

OTHER PUBLICATIONS

Barnes, Dan et al., "Exploiting 3D Semantic Scene Priors for Online Traffic Light Interpretation," IEEE Intelligent Vehicles Symposium (IV), Seoul, Korea, pp. 573-578, Jun. 28, 2015.

(Continued)

*Primary Examiner* — Asghar H Bilgrami
(74) *Attorney, Agent, or Firm* — Slayden Grubert Beard PLLC

(57) ABSTRACT

The invention relates to a method for supporting an advanced driver assistance system in a motor vehicle, comprising the following steps: providing a map, wherein categorized objects are stored in associated positions in the (Continued)

map, capturing environment data using at least one environment sensor system of the advanced driver assistance system, analyzing the captured environment data using an analysis apparatus of the advanced driver assistance system, wherein the captured environment data are analyzed for object recognition according to the categorized objects stored in the map. Furthermore, the invention relates to an associated device.

19 Claims, 4 Drawing Sheets

(51) Int. Cl.
| | |
|---|---|
| B60W 50/00 | (2006.01) |
| G06F 17/18 | (2006.01) |
| G06K 9/62 | (2022.01) |
| G06V 10/00 | (2022.01) |
| G06V 20/58 | (2022.01) |

(56) References Cited

U.S. PATENT DOCUMENTS

| | | | |
|---|---|---|---|
| 9,342,986 B2* | 5/2016 | Dariush | G08G 1/166 |
| 9,761,142 B2* | 9/2017 | Pflug | B62D 6/00 |
| 2006/0220943 A1 | 10/2006 | Schlick et al. | 342/70 |
| 2007/0031008 A1 | 2/2007 | Miyahara | 382/106 |
| 2008/0243378 A1* | 10/2008 | Zavoli | G01C 21/28 |
| | | | 701/533 |
| 2009/0228204 A1* | 9/2009 | Zavoli | G01S 19/49 |
| | | | 701/532 |
| 2011/0040481 A1 | 2/2011 | Trombley et al. | 701/301 |
| 2011/0130114 A1 | 6/2011 | Boudville | 455/404.2 |
| 2011/0211760 A1 | 9/2011 | Boncyk et al. | 382/190 |
| 2012/0303258 A1* | 11/2012 | Pampus | B60W 30/0956 |
| | | | 701/301 |
| 2014/0244142 A1* | 8/2014 | Matsubara | B60W 10/20 |
| | | | 701/116 |
| 2015/0003683 A1* | 1/2015 | Grewe | G06K 9/00624 |
| | | | 382/104 |
| 2015/0025795 A1 | 1/2015 | Firl et al. | 701/461 |
| 2015/0148985 A1 | 5/2015 | Jo | 701/1 |
| 2015/0154461 A1 | 6/2015 | Kitaura et al. | 348/148 |
| 2016/0049078 A1* | 2/2016 | Neff | B60W 40/02 |
| | | | 701/301 |
| 2016/0342850 A1* | 11/2016 | Elimalech | G08G 1/167 |
| 2017/0307743 A1* | 10/2017 | Izzat | G06K 9/00805 |
| 2018/0046191 A1* | 2/2018 | Keller | B60W 30/18163 |

FOREIGN PATENT DOCUMENTS

| | | | |
|---|---|---|---|
| DE | 10258097 A1 | 7/2004 | G01S 13/06 |
| DE | 102004018288 A1 | 11/2005 | B60R 1/10 |
| DE | 102006036402 A1 | 4/2007 | B60W 30/08 |
| DE | 10115080 B4 | 7/2007 | B60K 28/10 |
| DE | 102011107458 A1 | 1/2013 | G07C 11/00 |
| DE | 102014217847 A1 | 3/2016 | G01C 21/28 |
| DE | 102016215249 A1 | 2/2018 | B60W 40/02 |
| WO | 2015/189851 A1 | 12/2015 | G06K 9/00 |
| WO | 2018/033269 A1 | 2/2018 | G06K 9/00 |

OTHER PUBLICATIONS

German Office Action, Application No. 102016215249.1, 8 pages, dated Jun. 1, 2017.

International Search Report and Written Opinion, Application No. PCT/EP2017/064407, 9 pages, dated Aug. 29, 2017.

* cited by examiner

METHOD AND DEVICE FOR SUPPORTING AN ADVANCED DRIVER ASSISTANCE SYSTEM IN A MOTOR VEHICLE

CROSS-REFERENCE TO RELATED APPLICATIONS

This application is a continuation of U.S. patent application Ser. No. 16/325,971, filed on Feb. 15, 2019 which claims priority to German Application No. DE 10 2016 215 249.1, filed on Aug. 16, 2016 with the German Patent and Trademark Office. The contents of the aforesaid application are incorporated herein for all purposes.

The invention relates to a method and a device for supporting an advanced driver assistance system in a motor vehicle.

BACKGROUND

Modern motor vehicles offer a plurality of advanced driver assistance systems that support the driver in driving the motor vehicle. Such advanced driver assistance systems may include parking assist systems, lane departure warning or lane keeping systems, or navigation apparatuses, etc.

Operating advanced driver assistance systems typically involves using an environment sensor system to capture an environment of the motor vehicle and analyzing the environment data that are generated. In doing so, it is possible that the environment data are misinterpreted and incorrect conclusions are drawn based on the analysis, for example because objects in the environment were not recognized correctly.

SUMMARY

Thus, a technical object exists of providing a method and a device for supporting an advanced driver assistance system in a motor vehicle in which an analysis of captured environment data is improved.

The technical object is achieved according to the invention by a method and a device according to the independent claims. Embodiments of the invention are described in the dependent claims and in the following description.

In one aspect, a method for supporting an driver assistance system in a motor vehicle is made available, which comprises the following steps: providing a map, wherein categorized objects are stored in associated positions in the map, capturing environment data using at least one environment sensor system of the advanced driver assistance system, analyzing the captured environment data using an analysis apparatus of the advanced driver assistance system, wherein the captured environment data are analyzed for object recognition according to the categorized objects stored in the map.

In another aspect, a device for supporting a driver assistance system in a motor vehicle is provided, comprising a controller for processing a map that has been provided, wherein categorized objects are stored in associated positions in the map, an advanced driver assistance system which has at least one environment sensor system for capturing environment data and an analysis apparatus, wherein the analysis apparatus is designed such that the environment data captured are analyzed for object recognition according to the categorized objects stored in the map.

DETAILED DESCRIPTION

Figure 1:
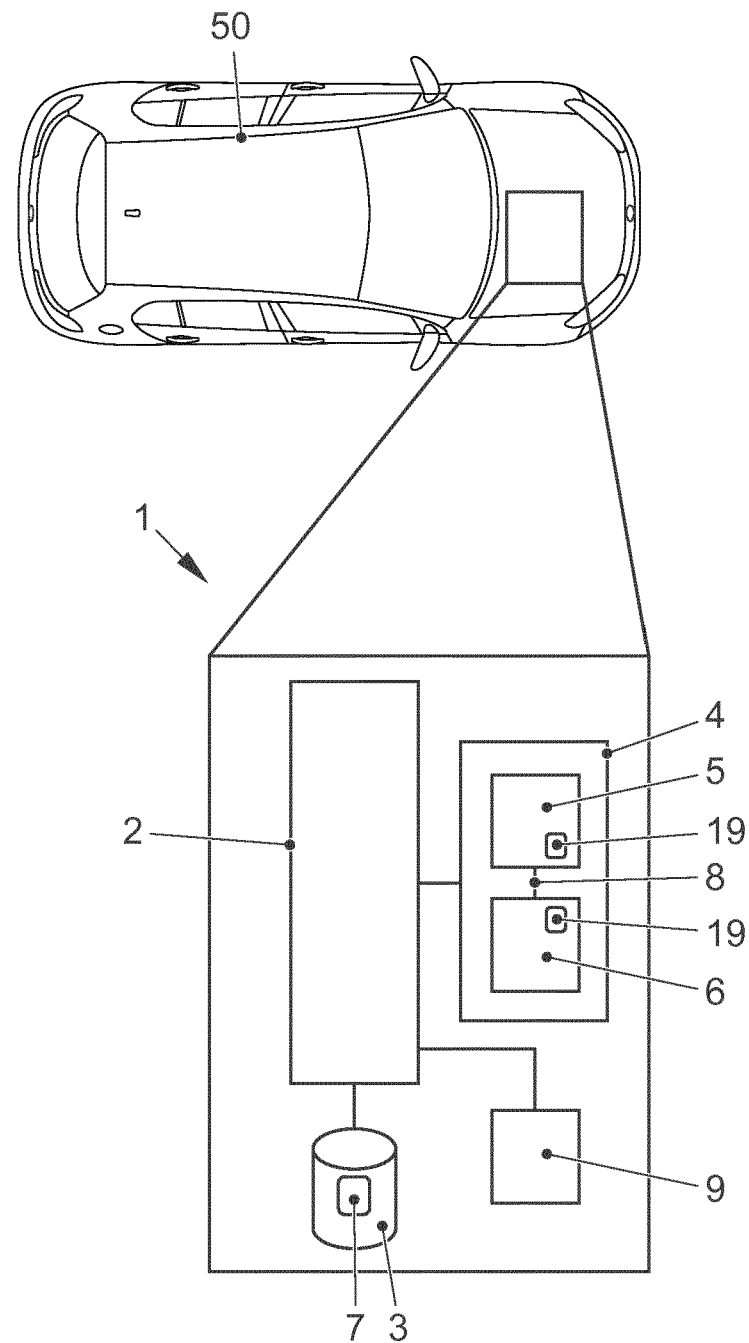
FIG. 1 shows a schematic representation of an embodiment of a device for supporting an advanced driver assistance system in a motor vehicle.

One basic idea of the present teaching is to take into account already existing information, which is provided in a map in the form of categorized objects, for analyzing captured environment data. In this manner, the performance of object recognition and object categorization using captured environment data can be improved. For this purpose, environment data are captured by at least one environment sensor system of an advanced driver assistance system and analyzed in an analysis apparatus of the advanced driver assistance system. The analysis includes recognition of objects from the captured environment data. In doing so, the objects may particularly be categorized.

In some embodiments, the analysis is performed using pattern recognition methods. The pattern recognition methods determine features, for example, that are characteristic of defined objects based on which the object may be identified and/or categorized. By determining relative positions of the objects in the environment of the motor vehicle, the motor vehicle may, e.g., locate its position on the map by comparing it against the categorized objects stored in the map and thus orient itself within the environment.

The motor vehicle locates its position on the map for example by comparing recognized objects and their relative positions within the environment of the motor vehicle against objects stored in the map. For this purpose, it may be provided in an embodiment that a rough localization is also performed by means of a global positioning system (e.g. GPS). Based on the position found, the controller will then determine e.g. objects that are stored in the map for the current environment. The objects, their relative positions, and their categorizations are then taken into account for the analysis.

One embodiment provides that a probability of existence of an object that is not unambiguously recognized in the captured environment data is raised based on at least one categorized object stored in the map. The probability of existence here will describe the probability of existence of a relevant object. Such a non-unambiguously recognized object may be a road marking, for example, that is partly covered with leaves or snow. In the map provided, this road marking is stored as a categorized object (or as several categorized objects), so that, even if the road marking is not unambiguously recognized in the environment data captured, it can be concluded that the road marking is present in this position. With the method described, the object recognition in the captured environment data thus becomes more robust.

Another embodiment provides that a probability of existence of an object that is recognized in the captured environment data is lowered based on at least one categorized object stored in the map. This is beneficial when it is to be avoided that the assistance system is triggered because of "phantom objects", for example. Here, "phantom objects" shall be objects that are misinterpreted by the advanced driver assistance system. Based on the categorized objects stored in the map, the plausibility of recognized objects can, however, be checked and, provided they are not relevant to the advanced driver assistance system, their respective probability of existence can be lowered. In an extreme case, such an object may even be completely rejected hereupon.

If the advanced driver assistance system receives environment data from a radar sensor system, for example, objects in the environment of the motor vehicle that appear to be obstacles from a greater distance but prove to not be an obstacle upon approach may be classified, using the method described, as less relevant by lowering their probability of existence. For radar sensors, objects of this type are in particular large metallic objects such as drain covers or overhead gantry signs across highways. If such "phantom objects" are stored in the map, they will be recognized accordingly when they are captured and analyzed again, and will be classified as less relevant or even rejected due to the probability of existence being lowered during the analysis.

Another example associated with a high-beam assist system illustrates the benefits offered by the method. Such a high-beam assist system (masked continuous high beam) is utilized during continuous high beam operation in order to automatically switch the high beams to low beams when oncoming motor vehicles are captured and recognized. In doing so, static light sources such as street lights may have an unwanted effect if they are wrongly recognized as oncoming motor vehicles. The method described now makes it possible to avoid switching to low beams based on categorized objects stored in the map for the street lights if the context makes it clear that the light sources captured are not headlights of oncoming motor vehicles but are instead street lights. Then, a plausibility check is run for the recognized objects using the categorized objects stored in the map for these positions and, provided they are not relevant to the corresponding advanced driver assistance system, i.e. the high-beam assist system in this example, they are categorized as less relevant or even as not relevant by means of a lower probability of existence. In the example, the high beams are thus not switched to low beams. This represents a significant gain in convenience and increases safety when driving a motor vehicle at night.

One embodiment provides that at least one parameter of the advanced driver assistance system is configured according to at least one categorized object stored in the map. In this manner, both the environment sensor system and the analysis apparatus can be adjusted to the objects anticipated to occur in the environment.

In particular, one embodiment provides in this regard that the at least one parameter indicates a resolution with which at least part of the captured environment data is analyzed. In this manner, it is possible to adjust the resolution of the analysis for specific regions or specific directions or solid angles of the environment. Accordingly, regions or directions of the environment in which specific categorized objects, e.g. objects that are of special relevance such as traffic lights or traffic signs with important traffic guidance information, can be analyzed with a higher resolution and thus in greater detail than other regions in which no or fewer relevant objects are anticipated. In this manner, it is possible to conserve computing power which is needed for the analysis.

It may be provided in a corresponding embodiment that the environment sensor system is a camera. The camera will then capture environment data in the form of images of the environment. In a captured image, it will then be possible to analyze a specific region that corresponds with a specific direction or a specific solid angle of the environment in greater detail than other regions. If, for example, a traffic light or a traffic sign is anticipated in a specific direction or solid angle, the region in the image corresponding with this direction or solid angle will be analyzed with a higher resolution than the remaining regions. The computing effort for analyzing the environment data can hereby be significantly reduced.

Another embodiment provides that an object that is stored in the map but which is not captured by the environment sensor system and/or is not recognized by the analysis apparatus in the captured environment data will be taken into account by the advanced driver assistance system. In this manner, objects that, either temporarily or due to an unfavorable direction of capture or an unfavorable angle or solid angle region of capture, are not depicted in the environment data captured, can still be taken into account by the advanced driver assistance system. Accordingly, e.g. obstacles that are categorized and stored in the map but are not currently being captured, for example due to weather conditions present at the time, can still be taken into account by the advanced driver assistance system.

Another embodiment provides that the objects are or are being categorized according to at least one of the following categories: a probability of existence, an object type, a sensor-dependent probability of capture, a traffic guidance relevance, a minimum resolution, and/or a weather dependency.

A probability of existence represents, e.g., a probability of the existence of a specific object. Such a probability of existence may also be dependent upon, e.g., a time of day, of the week, or of the year. For example, particularly vegetation manifests more prominently in the summer than in the winter, which causes objects corresponding with the vegetation to manifest differently or change over the course of the year.

An object type particularly designates the type of the object captured in general or in the context with respect to a specific advanced driver assistance system. Some non-exhaustive examples of object types are: traffic signs, vegetation, road markings, curbs, traffic lights, building facades, guard rails, guide posts, street lights, and city limits signs.

A sensor-dependent probability of capture may, e.g., particularly designate the suitability of the object for being able to be captured by a specific sensor or a specific sensor type. Such a sensor-dependent probability of capture may particularly be directionally dependent. For example, a radar sensor or a camera can capture a flat traffic sign very well from the front but only very poorly from the side.

A traffic guidance relevance may, e.g., designate the suitability or characteristic of an object for serving as a traffic guidance characterization. Accordingly, road markings that characterize and delimit individual lanes, for example, have a high traffic guidance relevance, a building facade, on the other hand, has a low traffic guidance relevance. Likewise, a sign promoting sights of interest for tourists will have a lower traffic guidance relevance compared to a speed limit sign.

A minimum resolution shall particularly characterize an object-dependent detail size that must be captured by a sensor for the object to be correctly recognized. In order to be able to recognize directional information for different places on a traffic sign from a specific distance, the letters and other characters printed on the traffic sign must be captured with a minimum resolution. Here, it may be particularly provided that the minimum resolution is derived depending on the situation from the object-dependent detail size. If the detail size is, for example, 1 cm, a higher minimum resolution must be used if the distance between the sensor system and the object is long than if the distance is short. The minimum resolution can thus be calculated as a function of the distance and the environment sensor system used.

A weather dependency designates a dependency between the object and weather conditions. If the environment sensor system is a camera, for example, objects are more difficult to capture during heavy rain than in sunny weather. In particular, the weather dependency may also be provided according to the environment sensor system used.

One embodiment provides that the map is provided using a map creator apparatus. Such a map creator apparatus may be formed e.g. onboard the motor vehicle. The map creator apparatus receives environment data from an environment sensor system, for example the same environment sensor system used by the advanced driver assistance system. Among the environment data received, the map creator apparatus recognizes objects using common pattern recognition methods. The recognized objects are categorized and allocated to an associated position on the map. Such a position may particularly be three-dimensional. The categorization(s) is (are) allocated to the object and the position of the object so that they can be retrieved after the map has been provided.

It may also be provided that the map creator apparatus is formed outside the motor vehicle in one embodiment. For example, the map may be provided by a commercial or non-commercial service. The map will then be created independently from the motor vehicle, e.g. using an area mapping vehicle dedicated to this purpose. The map created is then analyzed, revised, and, if applicable, augmented with additional environment data, objects, and categorizations.

The map created in this manner is then provided to the motor vehicle or, respectively, the device via a server, for example.

It may furthermore be provided that the created maps are exchanged and/or supplemented among different services or motor vehicles in some embodiments. In this manner, a current depiction of the physical world can be generated and provided at all times.

One embodiment provides that the map is updated based on the objects recognized in the environment data captured. For this purpose, the recognized objects are stored in the map with their categorizations and, where possible, older objects in the same positions are replaced with current objects and/or categorizations. It must, however, be ensured in this context that only if there is sufficient probability that a current object is truly located in the corresponding position and has a corresponding categorization should such an object replace the existing object in the map. One criterion that would, for example, have to be met for a replacement of the objects and/or the categorization to be implemented, is that the resolution with which the current object is to be captured is sufficiently high. Only if the resolution is sufficiently high will the object and/or the categorization be replaced. If, however, the resolution is not sufficient, no update is made in the map for the corresponding object and/or the categorization.

One embodiment provides that the environment sensor system is a camera. With the camera, visual images of the environment can be captured for a specific solid angle. In the captured images, objects and their categorizations can then be recognized using pattern recognition methods.

Further embodiments provide that the advanced driver assistance system is a position finding apparatus or a navigation apparatus or a lane departure warning or lane keeping assistant or a parking assist system or a lighting assistant or a traffic sign recognition apparatus.

Parts of the device may be formed individually or assembled as a combination of hardware and software, for example as programmed code that is executed in a microcontroller or a microprocessor.

In the following, the invention will be explained in greater detail with reference to the drawings using further exemplary embodiments.

In FIG. 1, a schematic representation of an embodiment of a device 1 for supporting an advanced driver assistance system 4 in a motor vehicle 50 is shown. The device 1 includes a controller 2, a memory 3, and an advanced driver assistance system 4. The advanced driver assistance system 4 comprises an environment sensor system 5 and an analysis apparatus 6. The advanced driver assistance system 4 may for example be a position finding apparatus, a navigation apparatus, a lane departure warning or lane keeping system, a parking assist system, a lighting assistant, a traffic sign recognition apparatus, or another suitable apparatus which supports the driver in driving the motor vehicle 50.

The environment sensor system 5, e.g. a camera, captures a current environment of the motor vehicle 50 and feeds captured environment data 8 to the analysis apparatus 6. These environment data 8 may for example be captured images of the environment. In the captured environment data 8, the analysis apparatus 6 recognizes objects using pattern recognition methods and categorizes these objects.

A map 7 in which categorized objects are stored in associated positions is stored in the memory 3. In general, the motor vehicle 50 is able to find its position within an environment based on the categorized objects stored in the map 7 and their associated positions.

The map 7 may for example be provided via a map creator apparatus 9 provided for this purpose. The map creator apparatus 9 has created the map e.g. on the basis of previously captured environment data or has been provided with them via an interface and has stored the map 7 in the memory 3 for later retrieval.

It is assumed, here, that the motor vehicle 50 has already found its position within the environment, for example using an apparatus designed for this purpose taking into account the map 7, or using a global positioning system (e.g. GPS). Only after this initial positioning will the controller 2 retrieve the stored categorized objects for the current environment from the map 7.

The controller 2 retrieves the map 7 stored in the memory 3, at least for the current environment, and provides this retrieved map to the advanced driver assistance system 4. The analysis apparatus 6 of the advanced driver assistance system 4 is designed such that the captured environment data 8 are analyzed for object recognition according to the categorized objects stored in the map 7.

Such an analysis may provide e.g. that a probability of existence of an object that is not unambiguously recognized in the captured environment data 8 is raised based on at least one categorized object stored in the map 7. Furthermore, it may also be provided that an object recognized in the captured environment data 8 is evaluated as less relevant or, in extreme cases, even rejected completely as a non-relevant object, based on at least one categorized object stored in the map 7, by lowering its probability of existence. In addition, it may be provided that at least one parameter of the advanced driver assistance system 4 is configured according to at least one categorized object stored in the map 7. Particularly, it may be provided that this at least one parameter indicates a resolution with which at least part of the captured environment data 8 is being analyzed.

It may furthermore be provided that the analysis apparatus 6 of the advanced driver assistance system 4 is designed such that an object stored in the map 7 that is not captured by the environment sensor system 5 and/or that is not recognized by the analysis apparatus 6 in the captured environment data 8 is taken into account anyway.

The objects stored in the map 7 may for example be categorized according to the following categories: a probability of existence, an object type, a sensor-dependent probability of capture, a traffic guidance relevance, a minimum resolution, and/or a weather dependency.

It may be provided that the map 7 is updated based on the objects recognized in the captured environment data 8 by the analysis apparatus 6. It must, however, be ensured in this context that only if there is sufficient probability that an object recognized at the time is truly located in the corresponding position on the map 7 and has a corresponding categorization should such an object replace the existing object in the map 7. One criterion that would, for example, have to be met for a replacement of the objects and/or the categorization to be implemented, is for example that the resolution with which the current object is to be captured is sufficiently high.

It may furthermore be provided that at least one parameter 19 of the advanced driver assistance system 4 is configured according to at least one categorized object stored in the map 7. This may for example be a resolution with which the environment sensor system 5 captures the environment or with which the analysis apparatus 6 analyzes the captured environment data 8.

Figure 2A:
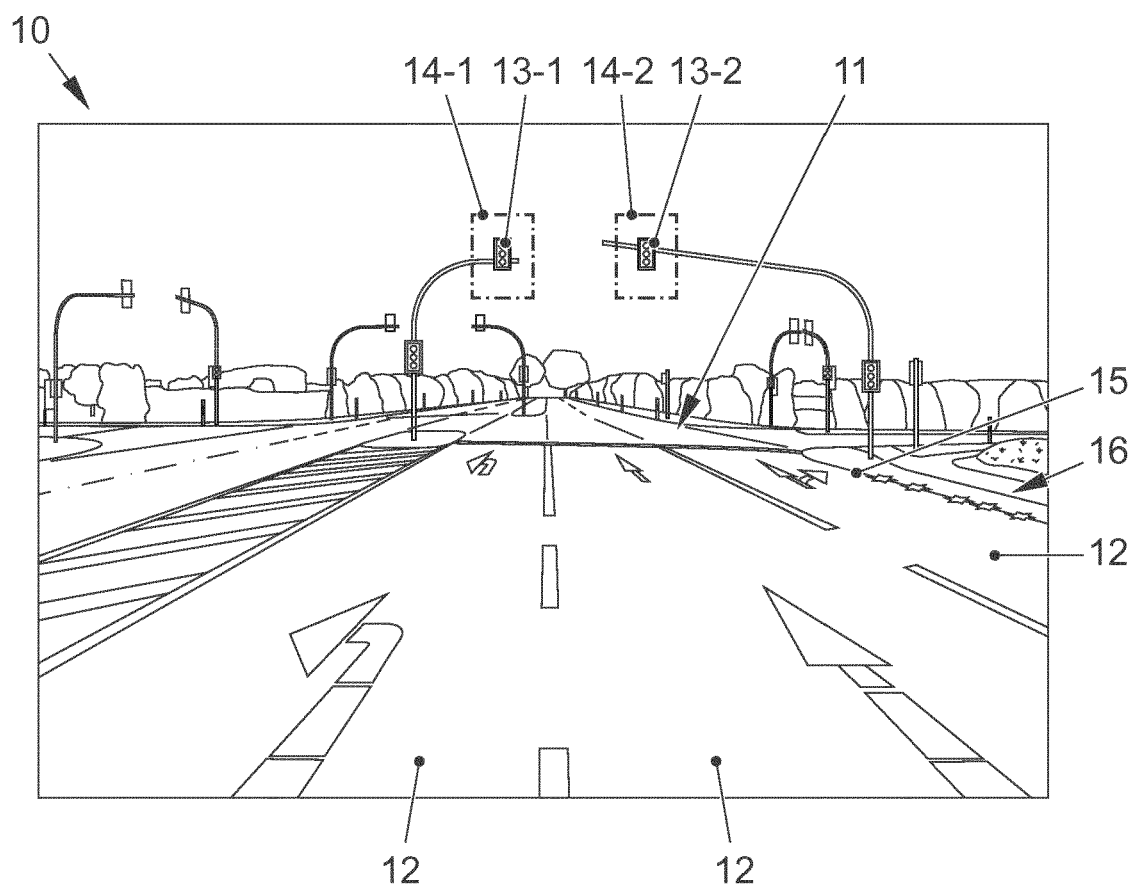
FIG. 2a shows a schematic representation of a typical road traffic scene at an intersection.
Figure 2B:
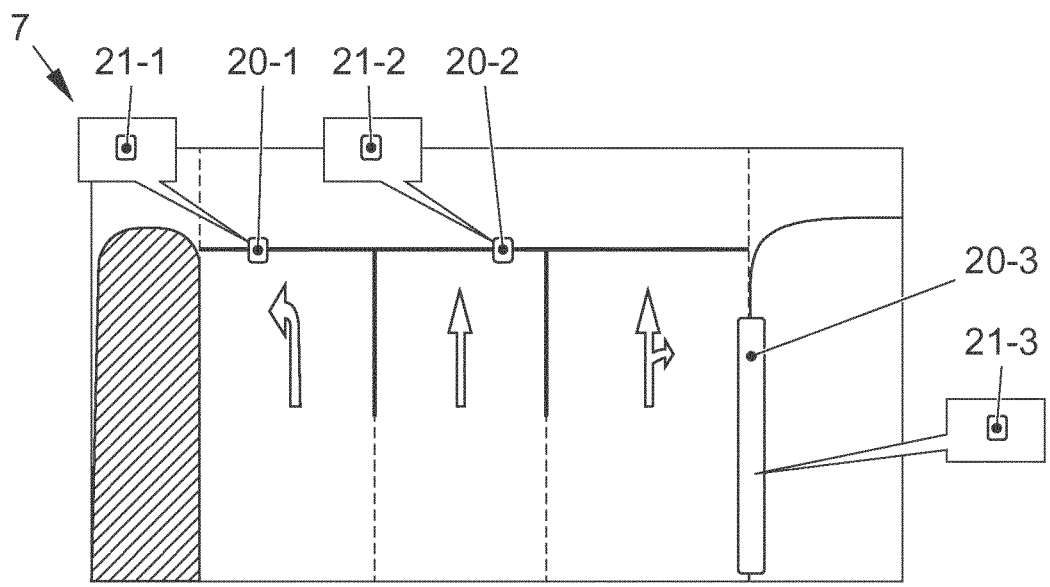
FIG. 2b shows a schematic map associated with the scene represented in FIG. 2a, in which categorized objects are stored.

FIG. 2*a* shows a schematic representation of a typical road traffic scene 10 at an intersection 11 for illustrating the method. FIG. 2*b* shows a schematic map 7 associated with the scene 10 represented in FIG. 2*a*, in which categorized objects 20-1, 20-2, 20-3 are stored.

The schematic scene 10 represented in FIG. 2*a* corresponds for example with an image captured by a camera of a motor vehicle at the moment when the vehicle approaches the intersection 11. In the schematically represented scene 10, the intersection 11 with multiple lanes 12, multiple traffic lights 13-1, 13-2, and exemplary road markings 15 can be seen. The schematically represented scene 10 represents environment data captured by the camera. These captured environment data are analyzed by the analysis apparatus of the advanced driver assistance system according to the categorized objects 20-1, 20-2, 20-3 stored in the map 7.

For the traffic lights 13-1, 13-2, for example, the objects 20-1 and 20-2 are stored in the map 7. These objects 20-1 and 20-2 have the categorizations 21-1, 21-2. The categorizations 21-1, 21-2 may e.g. indicate that the objects 20-1, 20-2 are traffic lights. Here, a directional dependency in particular may also be provided. Accordingly, the categorizations 21-1, 21-2 may for example provide that the traffic lights 13-1, 13-2 can only be captured and/or recognized in the direction of the motor vehicle approaching the intersection 11 from the direction represented. In particular, it may now be provided that at least one parameter of the advanced driver assistance system is configured based on the categorized objects 20-1, 20-2 stored in the map 7. For example, such a parameter may indicate a minimum resolution with which specific objects or regions or solid angle regions in the captured environment data must be analyzed. It may e.g. be provided that the regions 14-1, 14-2 marked in FIG. 2*a*, which include the traffic lights 13-1, 13-2 in a captured image, are captured and/or analyzed with a higher resolution. The remaining regions, which are not part of the regions 14-1, 14-2, are captured and/or analyzed accordingly with a lower resolution. Thereby, computing power can be conserved during the analysis.

It is possible that an object 20-3 stored in the map 7 is not recognized unambiguously in the captured environment data. This may be, for example, the road marking 15, on which leaves 16 are present. The leaves 16 result in the environment sensor system not being able to capture the road marking 15 completely and coherently and the analysis apparatus therefore not being able to recognize the road marking 15 unambiguously. It is then provided, here, that the road marking 15, which was not recognized unambiguously, or the associated object 20-3, which was not recognized unambiguously, respectively, is evaluated as a relevant object based on the categorized object 20-3 stored in the map 7 for the road marking 15. Although the road marking 15 was not recognized unambiguously, a corresponding object can thus be taken into account by the advanced driver assistance system based on the categorized object 20-3 stored in the map 7. If the advanced driver assistance system is e.g. a lane departure warning or lane keeping assistant, the lane departure warning or lane keeping assistant can take the road marking 15 into account for keeping the lane despite it being covered with the leaves 16.

Figure 3A:
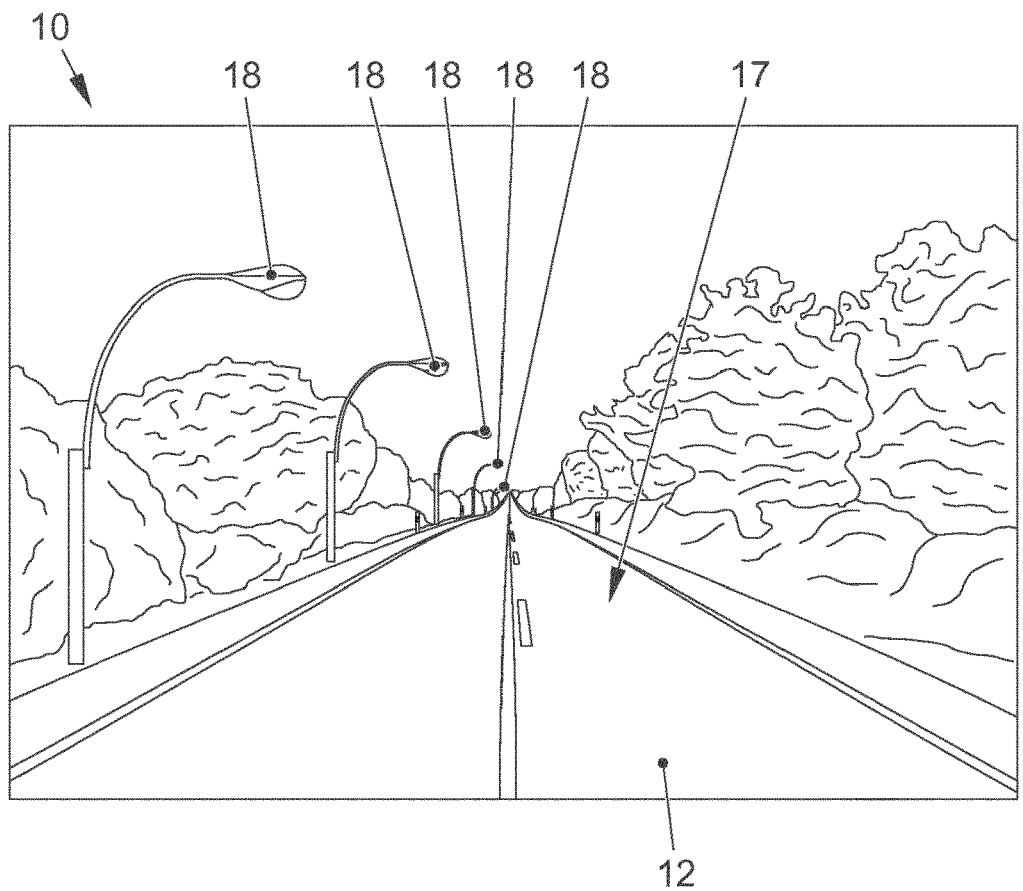
FIG. 3a shows a schematic representation of another typical road traffic scene on a country road at night.
Figure 3B:
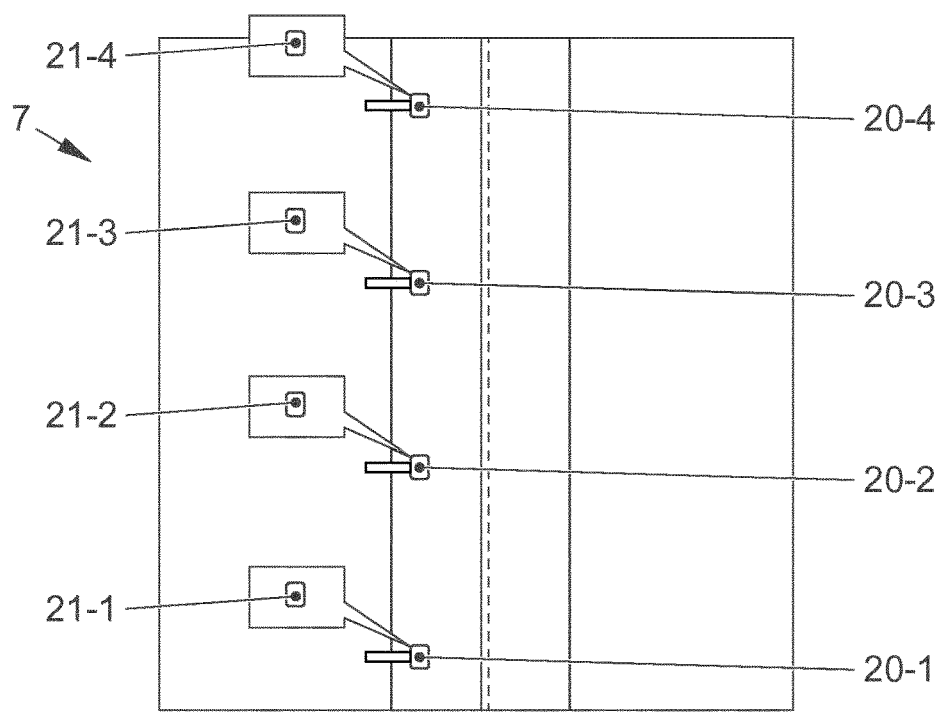
FIG. 3b shows a schematic map associated with the scene represented in FIG. 3a, in which categorized objects are stored; and0

To further illustrate the embodiments, FIG. 3*a* shows a schematic representation of another typical road traffic scene 10 on a country road 17. Corresponding to the scene 10 represented in FIG. 3*a*, an associated schematic map 7 is shown in FIG. 3*a*, in which categorized objects 20-1, 20-2, 20-3, 20-4 are stored. The country road 17 is lined with street lights 18.

If the advanced driver assistance system is, for example, a high-beam assist system (masked continuous high beam), a wrongly executed switch to low beams can be avoided based on the categorized objects 20-1, 20-2, 20-3, 20-4 stored in the map 7, which are associated with each of the street lights 18. A motor vehicle that is, for example, located in the lane 12 captures the light cones of the street lights 18 using its environment sensor system. It is then possible that the captured light cones of the street lights 18 are wrongly recognized by the analysis apparatus as oncoming motor vehicles. The method described, however, achieves that the advanced driver assistance system analyzes the captured environment data for object recognition according to the categorized objects 20-1, 20-2, 20-3, 20-4 stored in the map 7.

The categorizations 21-1, 21-2, 21-3, 21-4 allocated to the objects 20-1, 20-2, 20-3, 20-4 stored in the map 7 may, for example, indicate that they are street lights 18 and thus static light objects. Due to this pre-existing information, the analysis apparatus can reject the objects recognized in the captured environment data, i.e. in this case the light cones of the individual street lights 18, as non-relevant objects based on the categorized objects 20-1, 20-2, 20-3, 20-4 stored in the map 7.

This results in the high-beam assist system not switching the high beams to low beams. Thereby, convenience and safety are increased for the motor vehicle, such that an unnecessary reduction of the illumination is avoided.

Figure 4:
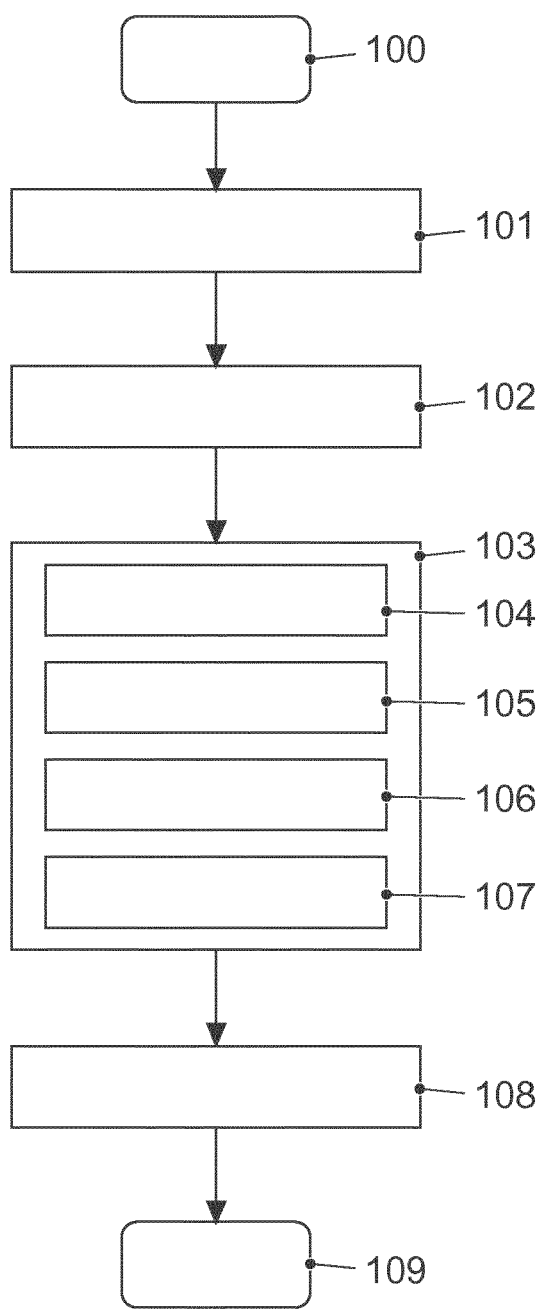
FIG. 4 shows a schematic flow chart of a method for supporting an advanced driver assistance system in a motor vehicle.

FIG. 4 shows a schematic flow chart of a method for supporting an advanced driver assistance system in a motor vehicle. After the start 100 of the method, a map with categorized objects stored therein is provided in a first method step 101. The provision may for example be performed using a map creator apparatus. Alternatively, the map may also be stored in a memory.

In the subsequent method step 102, environment data of an environment of the motor vehicle are captured with at least one environment sensor system of an advanced driver assistance system of a motor vehicle. Such an environment sensor system may e.g. be a camera that captures images of the environment of the motor vehicle.

It is assumed, here, that the motor vehicle has already found its position within the environment, for example using an apparatus designed for this purpose, taking into account the map or using a global positioning system (e.g. GPS). Only after this initial position finding will the controller 2 retrieve the stored categorized objects for the current environment from the map 7.

Subsequently, the captured environment data are analyzed in the method step 103 using an analysis apparatus of the advanced driver assistance system, wherein the captured environment data are analyzed for object recognition according to the categorized objects stored in the map provided.

Hereby, it may be provided for example in method step 104 that a probability of existence of an object in the captured environment data that is not unambiguously recognized is raised based on at least one categorized object stored in the map.

Additionally or alternatively, method step 105 may provide that a probability of existence of an object in the captured environment data that is recognized is lowered based on at least one categorized object stored in the map. Via a corresponding reduction of the probability of existence, an object may even be completely rejected.

Additionally or alternatively, method step 106 may provide that at least one parameter of the advanced driver assistance system is configured according to at least one categorized object stored in the map.

Method step 107 may furthermore provide that an object that is stored in the map but which is not captured by the environment sensor system and/or is not recognized by the analysis apparatus in the captured environment data will still be taken into account by the advanced driver assistance system.

A final method step 108 may provide that the map is updated based on the objects recognized in the captured environment data. It must, however, be ensured in this context that only if there is sufficient probability that a current object is truly located in the corresponding position and has an appropriate categorization should such an object replace the existing object in the map. One criterion that would, for example, have to be met for a replacement of the objects and/or the categorization to be implemented, is for example that the resolution with which the current object is to be captured is sufficiently high. Then, the method is at an end 108.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

REFERENCE LIST

1 Device
2 Controller
3 Memory
4 Advanced driver assistance system
5 Environment sensor system
6 Analysis apparatus
7 Map
8 Environment data
9 Map creator apparatus
10 Scene
11 Intersection
12 Lane
13-1 Traffic light
13-2 Traffic light
14-1 Region
14-2 Region
15 Road marking
16 Leaves
17 Country road
18 Street light
19 Parameter
20-1 Object
20-2 Object
20-3 Object
20-4 Object
21-1 Categorization
21-2 Categorization
21-3 Categorization
50 Motor vehicle That invention claimed is:

1. A method for supporting an advanced driver assistance system in a motor vehicle, comprising the steps of:
   determining a position of the motor vehicle;
   providing a map of the determined position, wherein categorized objects are stored in associated positions in the map;
   capturing environment data of the determined position using at least one environment sensor system of the advanced driver assistance system;
   analyzing the captured environment data using an analysis apparatus of the advanced driver assistance system, wherein the captured environment data are analyzed for object recognition according to the categorized objects stored in the map, wherein a probability of existence of an object in the captured environment data is evaluated based on at least one categorized object stored in the map.

2. The method according to claim 1, wherein the evaluated probability of existence of an object that is not unambiguously recognized in the captured environment data is raised based on at least one categorized object stored in the map.

3. The method according to claim 1, wherein the evaluated probability of existence of an object that is recognized in the captured environment data is lowered based on at least one categorized object stored in the map.

4. The method according to claim 1, wherein at least one parameter of the advanced driver assistance system is configured according to at least one categorized object stored in the map.

5. The method according to claim 1, wherein the at least one parameter indicates a resolution with which at least part of the captured environment data is analyzed.

6. The method according to claim 1, wherein an object that is stored in the map, but which is not captured by the environment sensor system and is not recognized by the analysis apparatus in the captured environment data is taken into account by the advanced driver assistance system.

7. The method according to claim 1, wherein the objects are categorized according to at least one of the following categories: a probability of existence, an object type, a sensor-dependent probability of acquisition, a traffic guidance relevance, a minimum resolution, and a weather dependency.

8. The method according to claim 1, wherein the map is provided by a map creator apparatus.

9. The method according to claim 1, wherein the map is updated based on the objects recognized in the captured environment data.

10. A device for a motor vehicle, comprising:
a device that determines a position of the motor vehicle;
an environment sensor system that captures current environment data of the determined position;
a memory that stores a map of the determined position, wherein categorized objects are stored in associated positions in the map;
a controller that determines a position of the motor vehicle on the map, correlates categorized objects from the map with the captured environment data, conducts object recognition on the captured environment data using the correlated categorized objects from the map, and evaluates a probability of existence of an object in the captured environment data based on at least one categorized object stored in the map.

11. The device according to claim 10, wherein the evaluated probability of existence of an object that is not unambiguously recognized in the captured environment data is raised based on at least one categorized object stored in the map.

12. The device according to claim 10, wherein the evaluated probability of existence of an object that is recognized in the captured environment data is lowered based on at least one categorized object stored in the map.

13. The device according to claim 10, further comprising an advanced driver assistance system, wherein at least one parameter of the advanced driver assistance system is configured according to at least one categorized object stored in the map.

14. The device according to claim 13, wherein the at least one parameter indicates a resolution with which at least part of the captured environment data is analyzed.

15. The device according to claim 13, wherein an object that is stored in the map, but which is not captured by the environment sensor system and is not recognized by the analysis apparatus in the captured environment data is taken into account by the advanced driver assistance system.

16. The device according to claim 10, wherein the objects are categorized according to at least one of the following categories: a probability of existence, an object type, a sensor-dependent probability of acquisition, a traffic guidance relevance, a minimum resolution, and a weather dependency.

17. The device according to claim 10, wherein the map is provided by a map creator apparatus.

18. The device according to claim 10, wherein the map is updated based on the objects recognized in the captured environment data.

19. A device for a motor vehicle, comprising:
a global positioning system (GPS) device that determines a position of the motor vehicle;
an environment sensor system that captures environment data of the determined position;
a data processing system;
a non-transitory computer-readable storage device storing data for access by an application executed on the data processing system, the storage device comprising a map of the determined position, wherein categorized objects are stored in associated positions in the map; and
an advanced driver assistance application stored in the non-transitory computer-readable storage device and executable by the data processing system to:
determine a position of the motor vehicle on the map,
correlate categorized objects from the map with the captured environment data,
conduct object recognition on the captured environment data using the correlated categorized objects from the map, and
evaluate a probability of existence of an object in the captured environment data based on at least one categorized object stored in the map.

* * * * *